United States Patent [19]

Mattox

[11] 4,227,475
[45] Oct. 14, 1980

[54] WATERBORNE SIDEWALL AIR CUSHION VEHICLE

[76] Inventor: Darryl F. Mattox, 161 Pacific Rd., Palm Beach, N.S.W., 2108, Australia

[21] Appl. No.: 895,592

[22] Filed: Apr. 12, 1978

[30] Foreign Application Priority Data

Apr. 15, 1977 [AU] Australia ............... 24307/77

[51] Int. Cl.³ .............................. B63B 1/38
[52] U.S. Cl. .................. 114/67 A; 180/125; 180/126
[58] Field of Search ............... 114/67 A, 67 R; 180/124, 125, 126; 403/209, 213

[56] References Cited

U.S. PATENT DOCUMENTS

| | | | |
|---|---|---|---|
| 2,813,726 | 11/1957 | Leonard | 403/209 |
| 3,146,752 | 9/1964 | Ford | 114/67 A |
| 3,191,705 | 6/1965 | Jones et al. | 180/126 |
| 3,518,956 | 7/1970 | Girodin | 114/67 A |
| 3,532,180 | 10/1970 | Ford et al. | 180/126 |
| 3,756,342 | 9/1973 | Burdick | 180/126 |
| 3,773,006 | 11/1973 | Black | 114/67 A X |

FOREIGN PATENT DOCUMENTS

1210973  11/1970  United Kingdom .................. 114/67 A

Primary Examiner—Sherman D. Basinger
Attorney, Agent, or Firm—Stevens, Davis, Miller & Mosher

[57] ABSTRACT

A waterborne air cushion vehicle is described having a flat rigid upper rectangular sheet like platform, a plurality of flat rigid longitudinal walls attached substantially at right angles thereto and depending therefrom substantially parallel with the major axis of the platform. The outermost two walls are disposed as sidewalls along respective edges of the platform. The vehicle is provided with flexible trough shaped skirts which are independently movable with respect to the walls. A source of pressurized air forces air into the skirts and also into air cushion chambers located beneath the platform. The flexible skirts provide for less shock and resistance from wave formations due to the compression of the skirts.

11 Claims, 21 Drawing Figures

WATERBORNE SIDEWALL AIR CUSHION VEHICLE

This invention relates to an improvement in the total concept of sidewall waterborne air cushion vehicles.

The objects of this invention are: to reduce air cushion air supply requirements of waterborne air cushion vehicles thus reducing fan mechanism, ducting and power requirements; to supply a smoother ride and reduce noise; to supply greater stability and reversible operation; to reduce "hump drag" and wave making resistance at low speed; and to simplify the manufacture of flexible skirting, hull, sidewall and air ducting. Further it is an object to reduce the manufacturing and running costs of waterborne air cushion vehicles, so as to make them more commercially viable than at present; to supply greater passenger comfort; and to allow for wider application of air cushion vehicles.

The application, acceptance and commercial exploitation of waterborne air cushion vehicles has been limited by many factors, some of which are as follows: Due to the need for very high powered engines to supply the needed air cushion and propulsive power, and aggravated by the greater weight involved, both initial installation and running costs are high. As a consequence of the high power requirements noise is often a problem and in many cases costly innovations have had to be devised to reduce excessive noise. The configuration of skirting and sidewall arrangements can cause poor ride in choppy conditions, excessive air loss in any conditions, "hump drag" and wave making resistance at low speeds and costly manufacturure. The power required to overcome "hump drag" and wave making resistance at low speed necessitates higher powered engines than is required for normal operation at speed.

According to one embodiment of the invention there is provided a waterborne sidewall air cushion vehicle having four separate air cushions, these air cushions being contained at the top by a flat, rigid, rectangular sandwich-type construction that forms the base of the hull, and at the sides by three parallel rigid walls running along the entire length of the sandwich construction, one on either side and one centrally located between these. The air cushions are further contained at the ends by six equal length flexible skirts, one running across the entire width of each end of the two channels formed by the three rigid walls, and one in each channel located centrally between and parallel to the two end flexible skirts.

In operation the bottom of each flexible skirt sits just above the water whilst the three rigid walls protrude into the water to a sufficient extent to prevent air loss from under the two outside walls when the vehicle is operating over waves or choppy water.

Each of the six transverse flexible skirts is formed from one flat piece of flexible sheet material of minimal thickness and is approximately semicircular in cross-section, the two edges being attached to the hull across its width and at a distance apart and each end coming very close, but just not touching, the rigid side or centre wall that it intercepts.

According to a further embodiment, this semicircular type skirting arrangement may comprise two separate equal sized pieces of flat flexible material overlapped along one side, the overlap being held apart by flexible blocks spaced along it, so as to form jets directed into the air cushion. Further, a flap or diaphragm the same length as the skirt is attached along its edge to the air cushion side of the skirt, approximately half way between the jets and where the flexible skirt is attached to the hull. This flap is wide enough to cover the jets when forced to do so by oncoming wave pressure, thus preventing water from entering the jets. The flap is free to swing, but is attached to the flexible skirt in such a way so as to give it a tendency to maintain a position close to the flexible skirt and jets. In operation this flap will move either towards, or away from the jets, depending on pressure differences.

The sandwich construction is of sufficient depth to accommodate, at the bottom or elsewhere, a foam filled and/or compartmented buoyancy section capable of supporting the loaded vehicle, and an air duct occupying the full length, width and remaining depth of the sandwich. The foam type material may have a buoyancy greater than that of the material comprising the platform or the walls.

There are two different flexible skirting configurations incorporating the two different flexible skirts just described, one where six of the one piece flexible skirts without jets are positioned as described earlier, air being supplied through holes from the duct in the sandwich, both directly into the air cushions and directly into the six flexible skirts. The second configuration being where the two central flexible skirts are of the one piece type without jets, and the four end flexible skirts are of the two piece type with jets facing towards the central skirts. Air is supplied as in the first configuration except that the jets supply the air cushions, the openings directly into the air cushions being closed, but capable of opening as will be described later.

The flexible skirting arrangement, because it is not attached to the rigid sidewalls and is straight across the hull, is totally free to move when passing over wave formations thus creating a smoother ride and less resistance then the normal sidewall air cushion vehicle . . . (where skirts are restricted by double curved configuration and by being attached to the sidewall).

Where air is ducted through the four outside flexible skirts, the associated flap which is actuated by pressure from the air jets, and has freedom of movement, tends to follow wave formation more closely . . . (than the normal sidewall air cushion vehicle skirt), thus tending to retain more of the supplied air and in operation reducing air supply requirements. The flexible skirts, because they are straight, that is only bent one way, lend themselves to easy and less costly manufacture out of one piece of material and because of their uninhibited movement and reduced flexing stresses, less frequent replacement.

As a result of the configuration of the flexible skirts described above and their pattern or movement when operating over choppy water or wave formations, the air compression caused by skirt deflection is mainly transferred through the air inlet which covers the entire area of the base of the skirt, directly into the air ducting in the sandwich, and because the increased pressure is absorbed by the whole duct and is only effectively acting on the area covered by the flexible skirts, there is considerble reduction in the shock transferred to the hull from skirt deflection . . . (in the normal sidewall air cushion vehicle this air compression force, although smaller, is imparted to the whole area of the hull above the air cushion. This results in a considerable increase in the force imparted to the hull). From the above it can be seen that less wave shock from skirt deflection will be transferred to the hull, thus allowing for a smoother ride.

As the three sidewalls which run along the entire length of the hull are straight and parallel to each other and of uniform and minimum thickness (approximately two inches on a sixty foot hull), they create minimal resistance both wave making and frictional, and in conjunction with the flexible skirts, in the configuration previously described, tend to contain and reduce "hump drag" and wave making resistance, thus reducing propulsive power necessary to overcome these . . . (as compared to the normal sidewall air cushion vehicle where the vee section sidewalls, used to supply stability, create a fair amount of wave making and frictional resistance and do not tend to contain and reduce "hump drag").

The configuration of sidewalls of a uniform and minimal thickness and flexible skirts, as described earlier, allows the vehicle to be operated at full speed in either direction.

The air cushion vehicle described earlier in detail, has much the same stability characteristics as a flat-bottomed punt of the same dimensions, this by virtue of the fact that the four air cushions, although connected to the same ducting, are effectively isolated from each other by the fact that air pressure in the ducting and flexible skirts is maintained at a higher pressure than that of the air cushions.

The basic structure of sidewalls intergrated with sandwich construction incorporating air ducting, is very simple and lends itself to inexpensive manufacture.

The considerable saving in power requirements, as indicated above, allows for a great reduction in both the noise factor and the cost of installing, maintaining and running the mechanics of this air cushion vehicle.

According to the invention therefore a waterborne air cushion vehicle comprises, in combination, a flat rigid upper rectangular sheet-like platform, a plurality of flat rigid longitudinal walls attached substantially at right angles thereto and depending therefrom substantially parallel with the major axis of said platform, the outermost two of said walls being disposed as sidewalls along the respective edges of said platform, a plurality of longitudinally spaced laterally aligned arrays of flexible trough-shaped skirts respectively looped with a space therein and fastened via each longitudinal edge thereof with respect to the underside of said platform flush with but independently movable with respect to adjacent pairs of said walls but extendable to a lesser depth than that of said walls, a source of pressurised air admissible via apertures of fixed size at a relatively higher pressure to said skirts and also admissible at a relatively lower pressure via variable-size openings remotely controlled and located respectively in said platform in communication with open-bottomed air cushion chambers each bounded by an adjacent pair of said skirts and by an adjacent pair of said walls, and wherein the depth of said walls and of said skirts is so related to the flow rate of said air that the vehicle is buoyant upon water with said walls protruding into said water sufficiently to prevent air spillage via said walls when the vehicle is urged longitudinally through said water by propulsion means, and wherein said apertures and said openings are adapted to re-admit by reverse flow at least part of the compressed air in any one of said chambers and its associated skirts independently in response to fugitive deflection of said skirts resulting from turbulence of said water, to thereby inhibit movement of said vehicle about the pitch axis thereof.

Preferred practical embodiments of the invention will now be described with reference to the accompanying drawings in which.

Figure 1:
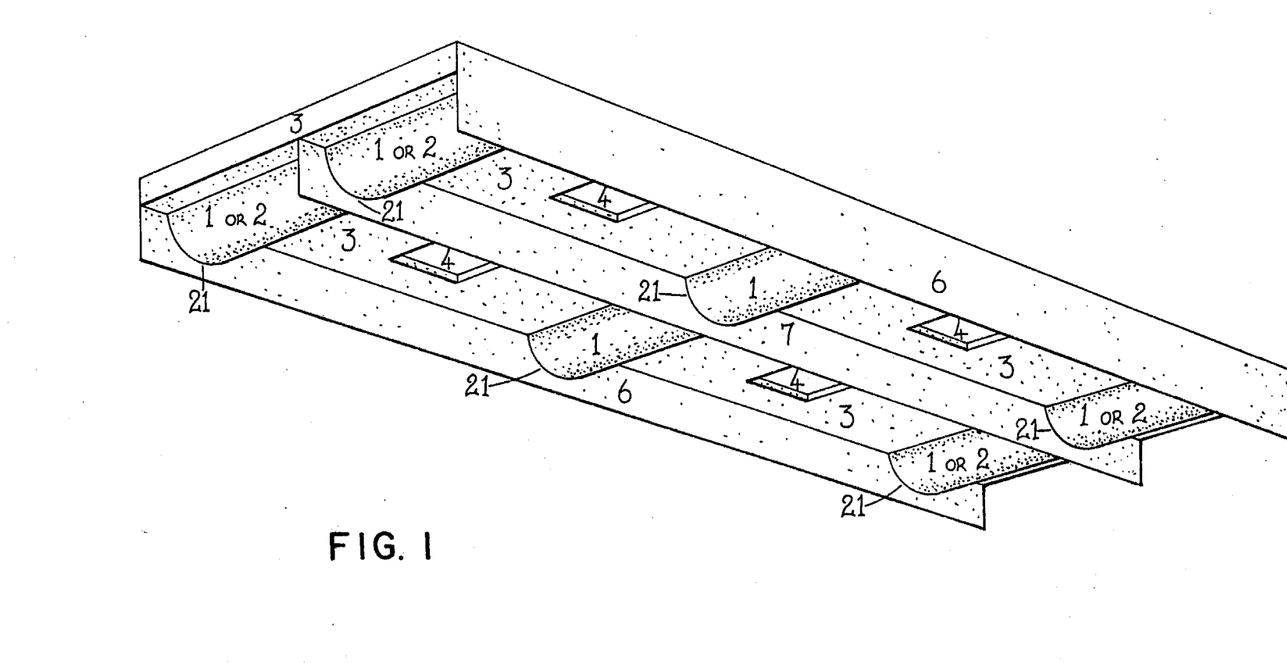
FIG. 1 is a perspective under view of the air cushion vehicle according to the invention (up to and including the "sandwich" construction).

In order to described the invention it will be convenient to do so with reference to FIGS. 1, 2, 3, 4, 14, 15, 16 and 17. As indicated, FIG. 1 is a perspective under view of the air cushion vehicle as far as the rigid sandwich construction 3. The sandwich construction is rectangular in shape and of sufficient depth to accommodate at the bottom, a foam filled buoyancy section 24, FIGS. 2 and 3, capable of supporting the loaded vehicle, and above this an air duct 5, occupying the full length, width and remaining depth of the sandwich construction. This air duct has outlets 4, FIGS. 1, 4, 16 and 17, into the air cushion, and 15 FIG. 16, into the flexible skirts 1 or 2. The outlets 4, are fitted with adjustable covers inside the sandwich construction. These covers are capable of being remotely controlled, and in operation can move with respect to the openings 4, so as to regulate the amount of air issuing from them. The covers can completely cover the openings so as to effectively stop the flow of air through the openings, or can be adjusted to any position, between this and where the opening is completely uncovered, allowing full air flow. Modifications of the last-mentioned sandwich construction would, of course, be made in the case where the foam filled buoyancy section is top mounted. It will be appreciated that, wherever mounted, said buoyancy section may be divided or channelled as desired, according to the overall design features of the vehicle, to allow flexibility in the disposition of ducts, controls, fittings and accommodation space.

Figure 18:
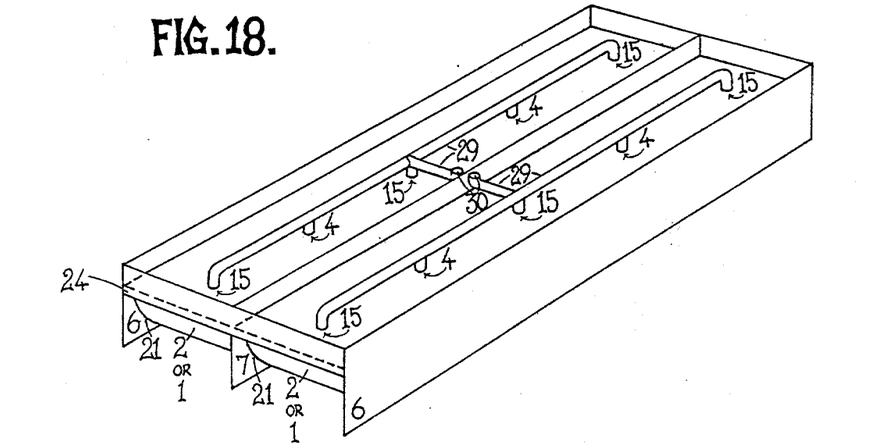
FIG. 18 is a perspective view of the vehicle showing the dendritic system of conduits 29 in communication with apertures 15, openings 4 for supplying air from a blower.

Alternatively, said sandwich construction may be dispensed with, in which case the ducts may be suspended within or with respect to a simple ribbed structure in a dendritic arrangement as shown in FIG. 18, akin to that of an air-conditioning installation, so as to supply the skirts and the air cushions at desired terminals registering with said skirts and air cushions. In a modification of this arrangement, the ducts could be replaced by conduits of any kind, such as thin high-pressure pipes which are adapted to be wound around any obstacles.

The three rigid walls 6 and 7, FIGS. 1, 2, 3 and 16, are of sandwich-type construction of uniform minimal thickness (approximately two inches on a sixty foot hull), and where they join the main sandwich 3, are integrated with its construction, and in the case of the sidewalls 6, extend to form the sides of the sandwich 3. Each of the three rigid walls 6 and 7 extend along the entire length of the hull, walls 6 one along each side of the hull, and wall 7 located centrally between and running parallel to walls 6. One example of such construction employs an assembly of square tubes of aluminium or any light-metal alloy clad with sheets which may be formed from the same or similar material.

Figure 5:
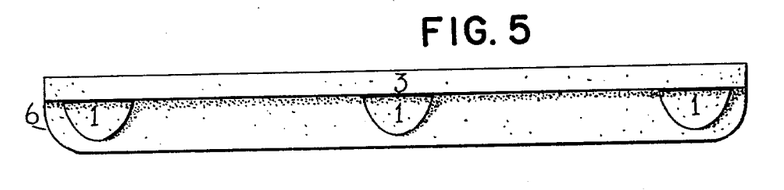
FIG. 5 is a diagrammatic sectional elevation on the line B—B FIG. 4, with "see through" side wall to expose the flexible skirt configuration with number 1 type skirts, and with rounded sidewall corners.

According to a further embodiment, the six unattached corners of the three rigid walls may be rounded as depicted in FIG. 5, and further to this, the thickness of the straight or rounded width edge at either end of the three rigid walls may be shaped to a point along the length of the wall, over sufficient distance to allow for good water piercing characteristics.

Figures 14, 15:
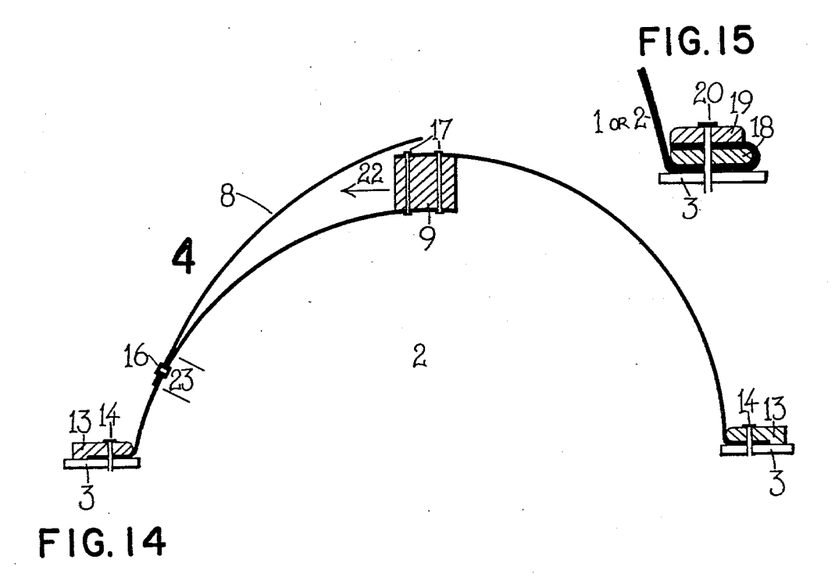
FIG. 14 is a diagrammatic sectional elevation on the line C—C FIG. 10 on a larger scale, with the skirt attached to the bottom surface of the sandwich construction, and upsidedown.
FIG. 15 is an expanded sectional view of an alternate flexible skirt clamp to the one covered by numbers 13 and 14 in FIG. 14.

The flexible skirts types 1 and 2 are attached to the sandwich 3 by means of a shaped bar 13 and bolts 14, FIG. 14. This clamps the flexible skirt along its length edge between the bar 13 and the surface of the sandwich 3. An alternate clamp is illustrated in FIG. 15, where the skirt type 1 or 2 passes between the bar 18 and sandwich 3, and returns around bar 18 to pass between bars 18 and 19, thus double clamping the skirt, bolts 20 retaining bars and skirt. The flexible skirts type 1 or 2 fit lengthwise across the width of the hull, each skirt fitting neatly into the channel formed between rigid walls 6 and 7, with minimum clearance 21, FIGS. 1, 2, 3 and 4, between the end of the skirt type 1 or 2 and the side of the rigid wall 6 or 7. Two skirts type 1 or 2, end to end and divided by the central rigid wall 7, run across the hull at each end between the two external walls 6. Two skirts type 1, end to end and divided by the central wall 7, run across the hull between the two external walls 6, these two type 1 skirts being centrally located between and parallel to the end type 1 or 2 skirts.

Although the clearance 21 is minimal, in no way is the free movement of the flexible skirts type 1 or 2 restricted by the sidewalls 6 and 7, and the flexible skirts type 1 or 2 are not attached in any way to the sidewalls 6 and 7, but rely on the minimal gap 21 to limit the air loss, which in turn is minimal.

Figure 2:
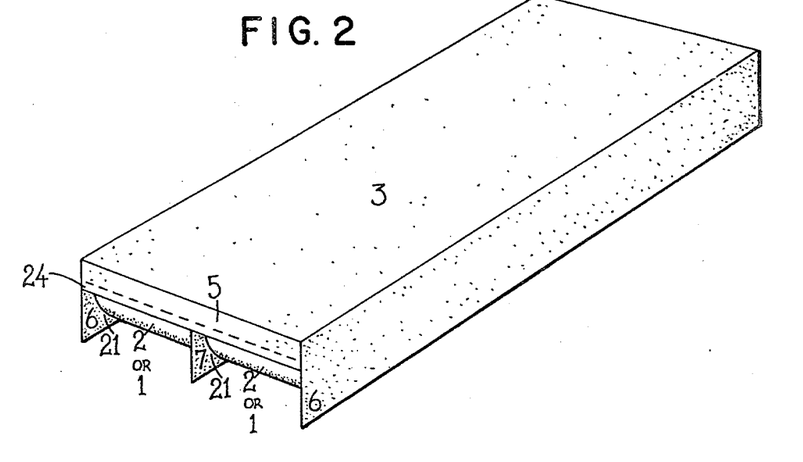
FIG. 2 is a perspective view of the air cushion vehicle up to and including the sandwich construction.
Figure 3:
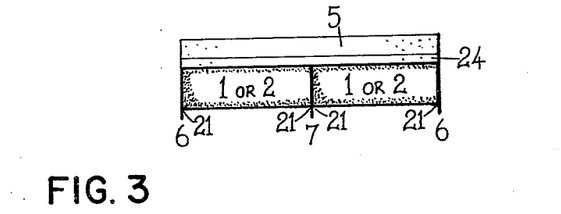
FIG. 3 is a diagrammatic sectional elevation on the line A—A FIG. 4, and showing the position of a type 1 skirt.

As can be seen from FIGS. 1, 2 and 3, the three rigid walls 6 and 7 extend down further than the six flexible skirts 1 or 2, and in operation the bottom of the rigid walls 6 and 7 protrude into the water to a sufficient extent to isolate the air cushions and to prevent air loss from under the two outside walls when the vehicle is operating over waves or choppy water, whilst the bottom of the flexible skirts type 1 or 2 sits just above the water.

Figure 6:
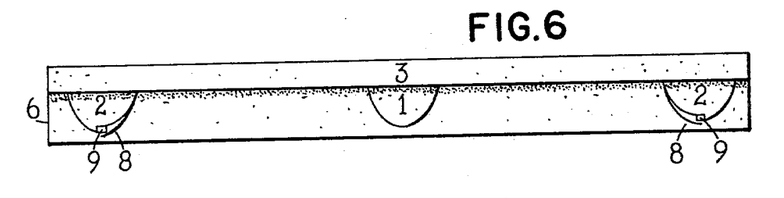
FIG. 6 is a diagrammatic sectional elevation on the line B—B FIG. 4, with "see through" side wall to expose the flexible skirt configuration with end skirts of the number 2 type.

FIGS. 5 and 6 represent the two different flexible skirting configurations. In FIG. 5, all flexible skirts are type 1, whilst in FIG. 6, the end flexible skirts are of type 2, placed so that the flexible flap 8 is on the air cushion side of the flexible skirt type 2, and so that the jets 10 in FIG. 8 are directed into the air cushion.

Figure 7:
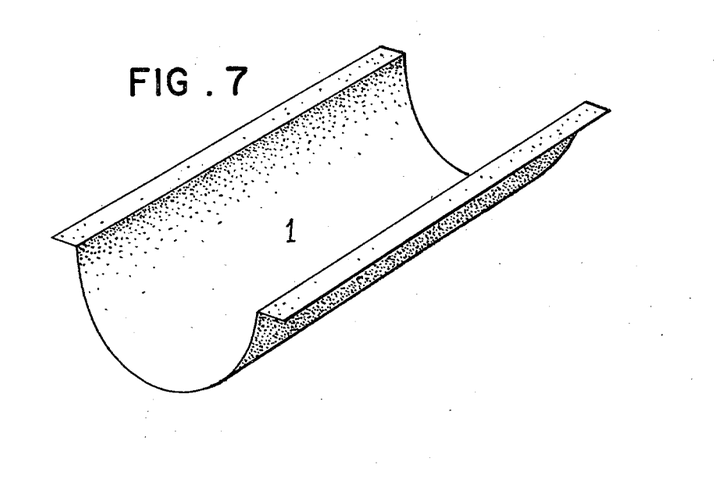
FIG. 7 is a perspective view of the number 1 type flexible skirt.
Figure 8:
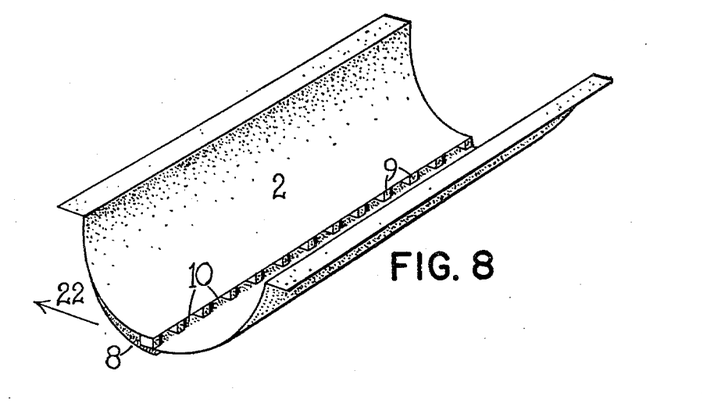
FIG. 8 is a perspective view of the number 2 type flexible skirt.
Figure 9:
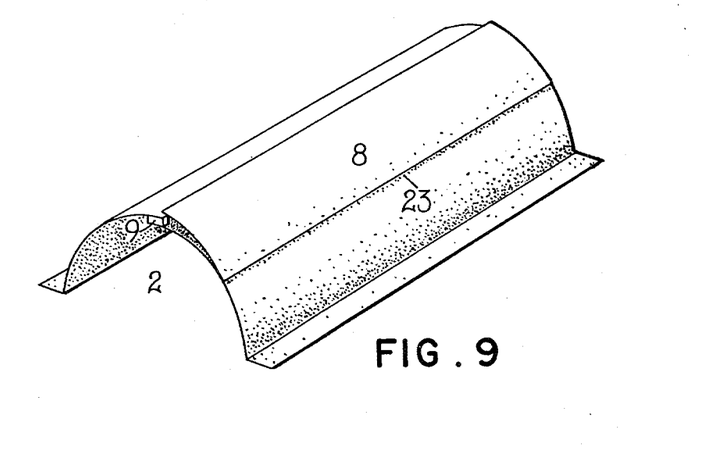
FIG. 9 is a perspective view of an upsidedown number 2 type flexible skirt.
Figure 10:
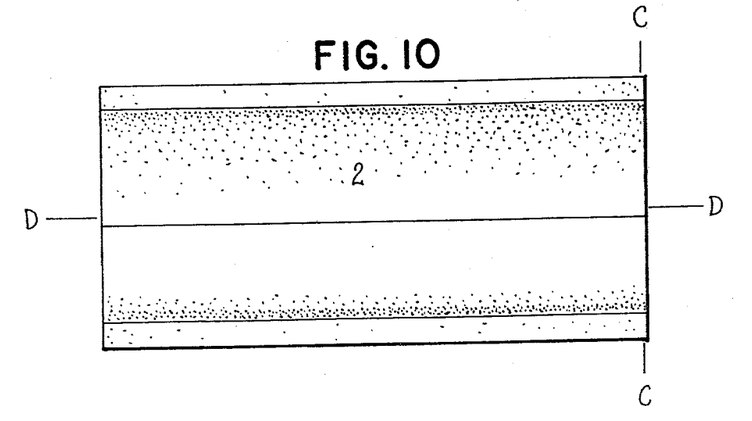
FIG. 10 is a plan of a number 2 type flexible skirt viewed from above.
Figure 11:
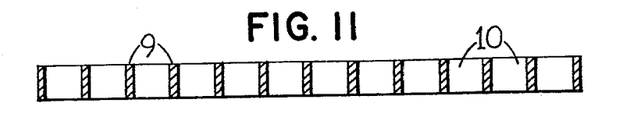
FIG. 11 is a diagrammatic sectional elevation on the line D—D FIG. 10.

FIGS. 7, 8, 9, 10, 11, 14 and 15 show the flexible skirts type 1 and 2. FIG. 7 is a number 1 type, whilst FIG. 8 is a number 2 type. As can be seen, the flexible skirt is semicircular in cross-section, or can deviate from this semicircular cross-sectional shape, in that the diameter of the semicircle be extended or reduced, whilst the length of the perimeter of the arc remains constant. The number 1 type being formed from one piece of flat flexible material of minimal thickness, whilst the number 2 type is formed from two pieces of the same flat flexible material of equal dimensions, lapped along one side, and held apart by flexible blocks 9 FIGS. 8, 9, 11 and 14, these flexible blocks being both chemically and mechanically bonded to the flexible skirt by means of adhesive and bolts 17, FIG. 14. In operation, when air is supplied to the skirt through opening 15, FIG. 16, and retained by rigid sidewalls 6 and 7, the holes 10, bounded by the flexible blocks 9, FIGS. 8 and 11, and flexible skirt, form air jets in the direction of arrow 22, FIGS. 8, 12, 13 and 14. The flexible flap or diaphragm 8 is formed from one piece of flat flexible material the same length as the skirt, and is bonded to the flexible skirt by rivets 16, FIG. 14, and chemically by adhesive in the area indicated by 23, FIG. 14, the width of the flap 8 being sufficient, when following the arc of the skirt, to cover the blocks 9 and jets 10 and extend half way across the overlap. This width may be extended to be any width between the above-mentioned width, and that of one piece of the two equal dimensioned flexible sheets comprising the skirt. When not in operation this flexible flap or diaphragm 8, because of the way it is attached to the flexible skirt, will naturally tend to assume a position somewhere near that indicated in FIG. 14. In operation the flap or diaphragm 8, although having a slight tendency to assume the position indicated in FIG. 14, is completely free to swing with the greater force.

Figure 12:
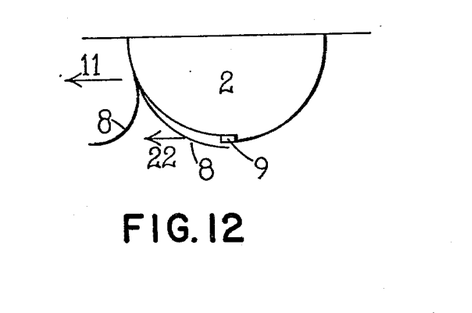
FIG. 12 is a diagrammatic sectional elevation on the line C—C FIG. 10, showing possible positions of the flexible flap 8, when the skirt is moving in the direction of arrow 11.

In FIG. 12, where a cross-sectional view of a rear or trailing flexible skirt type 2, is depicted moving in the direction of arrow 11, flap 8 is shown in two positions and could assume any position between these two. In operation, where oncoming wave pressure is greater at any one time than the pressure supplied from the air jets 10, FIGS. 8 and 11, the flap 8 would tend to assume the position indicated in FIG. 12 where it is covering the blocks 9 and jets 10, thus preventing water from entering the skirts through the jets. Where the pressure from the air jets 10 is greater at any one time than the oncoming wave pressure, the reverse will apply, and flap 8 will be away from the jets in any position between the two positions indicated in FIG. 12, or at the position indicated in FIG. 13. Because of the constant air pressure from the jets 10 and the opposing motion of the oncoming waves, the flexible flap 8 will be forced to follow the terrain of the wave surface as closely as possible, and because, for any air to escape from the air cushion, it has to displace the flap against the constant opposing pressure from the air jets 10, this configuration of flexible skirt type 2 and flap 8 tends to minimise the air loss from the air cushions.

Figure 13:
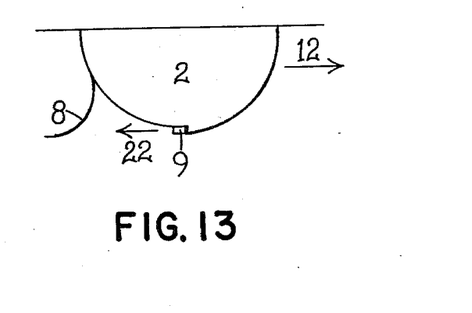
FIG. 13 is a diagrammatic sectional elevation on the line C—C FIG. 10, showing a possible position of the flexible flap 8, when the skirt is moving in the direction of the arrow 12.

FIG. 13 depicts a cross-sectional view of a front or leading flexible skirt type 2, and shows the approximate position the flexible flap 8 will assume when the skirt is travelling in the direction of the arrow 12. In operation the flap 8 will only move away from the jets 10 and oncoming wave pressure, as far as forced to by these, and because as mentioned earlier, the flap 8 has a natural tendency to assume the position indicated in FIG. 14, it will retain a pressure against the combined air jets and oncoming wave pressure. Thus for air to escape from the air cushion, it has to overcome the combined wave and air jets pressure and displace the flap 8, which will, as soon as the pressure is equalised, tend to move towards the jets, and in so doing seal down against the oncoming water. Hence the air escape from this type 2 flexible skirt, located at the front of the air cushion vehicle, will be severely restricted. As the flexible flap 8 is made from fairly light flexible sheet material, its momentum from movement in either direction will be small, hence the flap will be readily susceptible to any force opposing its direction of movement at any one time. This greatly enhances its ability to perform its function to the greatest extent possible, and coupled to the other characteristics of operation of the type 2 flexible skirt and flap configuration, described earlier, greatly reduces the air loss from air cushions.

The operation of this waterborne sidewall air cushion vehicle, with number 2 type end flexible skirts, and number 1 type central flexible skirts, as depicted in FIG. 6, is as follows:- Air from a centrifugal type blower, mounted anywhere on board, is dispensed directly into the air duct 5, it then flows to the central number 1 type flexible skirts, and the end number 2 type flexible skirts, via openings 15. The air is then directed by the jets 10 in the number 2 type end skirts, into the four air cushions. The pressure inside the ducting 5 and flexible skirts type 1 or 2, is at all times greater than the pressure in the four air cushions. This higher pressure in the ducting and flexible skirts, effectively isolates each separate air cushion, and allows the flexible skirts to retain their semicircular type cross-sectional shape against the lower air cushion pressure, and to regain quickly this semicircular type cross-sectional shape after being forced to deviate from it by wave pressure. The four separate air cushions give this air cushion vehicle similar stability characteristics to a flat-bottomed punt of the same dimensions. The openings 4 with adjustable covers as described earlier, are closed, but can be opened slightly to regulate the pressure in the ducting and skirts whilst the vehicle is operating, this so as to gain the best possible ride in any conditions.

Figure 19:
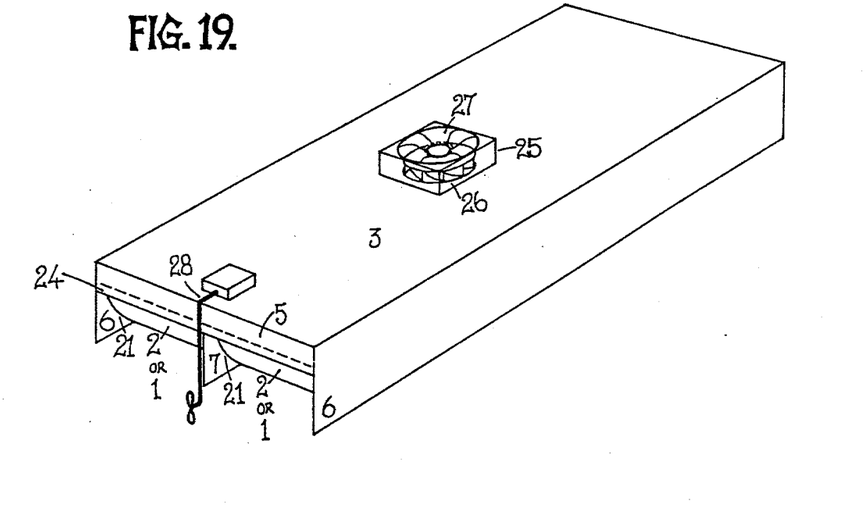
FIG. 19 is a perspective view of the vehicle equipped with an air supply and propulsion means.
Figure 20:
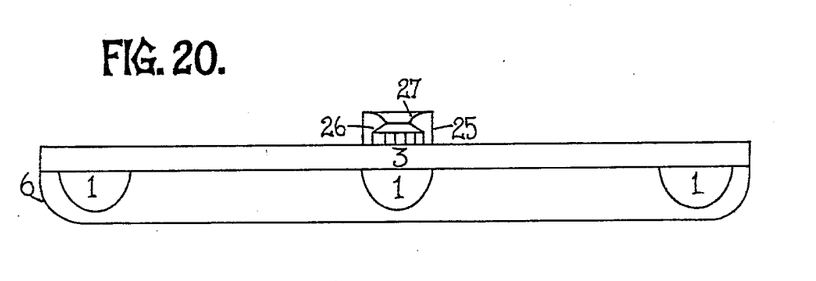
FIG. 20 is a side view of the vehicle illustrated in FIG. 19.
Figure 21:
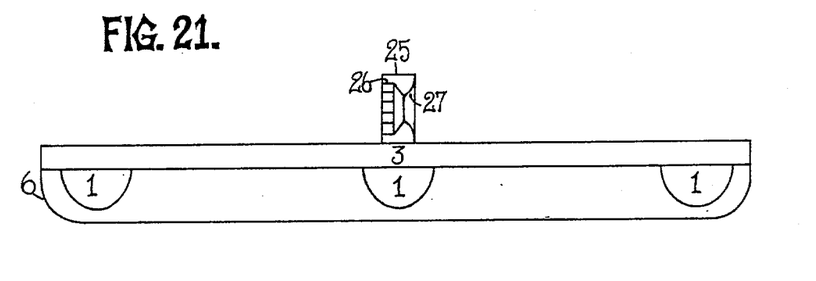
FIG. 21 is a side view of the vehicle showing a different position of an air supply.

FIGS. 19, 20 and 21 represent the placement of an air source with respect to the vehicle as required to provide the air flow into air duct 5. The air source may be a centrifugal runner or impeller 26 having an inlet 27 and carried by a blower housing 25. The vehicle is of course equipped with a propulsion means 28 which also drives the centrifugal runner or impeller 26. FIGS. 19, 20 and 21 are illustrative only of a method for providing the required source of air. Other methods will be obvious to those skilled in the art.

In operation over choppy water or wave formations, the flexible skirts 1 or 2 are totally free to move with the water as they are not bound to the sidewalls 6 and 7 but only to the sandwich 3. The operation of the type 2 flexible skirts, positioned at the front and rear of the air cushion vehicle, is as previously described. Further to this, because of the tendency of the combination of flap 8 and jets 10 to retain more of the supplied air . . . (than the normal sidewall air cushion vehicle skirt), when operating over choppy water or wave formations, and in order to allow for the escape of this supplied air, so as to retain the air cushion pressure at that pressure necessary to support the vehicle, this sidewall air cushion vehicle with type 2 flexible skirts as depicted in FIG. 6, tends to assume a position further above the wave troughs. This in effect means, that the flexible skirt is hitting less of the wave height and receiving less shock and resistance from wave formations than the normal sidewall air cushion vehicle . . . (which because of the inability of its skirting to closely follow wave or chop formation, must either assume a position closer to the wave troughs, in order to retain sufficient air pressure to support the vehicle, or must be supplied with a greater quantity of air to allow it to assume a higher position, either case requiring more power, the one to overcome the extra wave pressure associated with running closer to the wave troughs, and the other in supplying more air).

As mentioned earlier, the air compression caused by skirt deflection over waves is absorbed by the air duct 5, which, because of its size, reduces pressure rise considerably. This coupled to the skirt's pattern of movement as mentioned above and previously, and the fact that any pressure rise only effectively acts on the area covered by the flexible skirts, considerably reduces the shock transmitted to the hull from skirt deflection.

Figure 16:
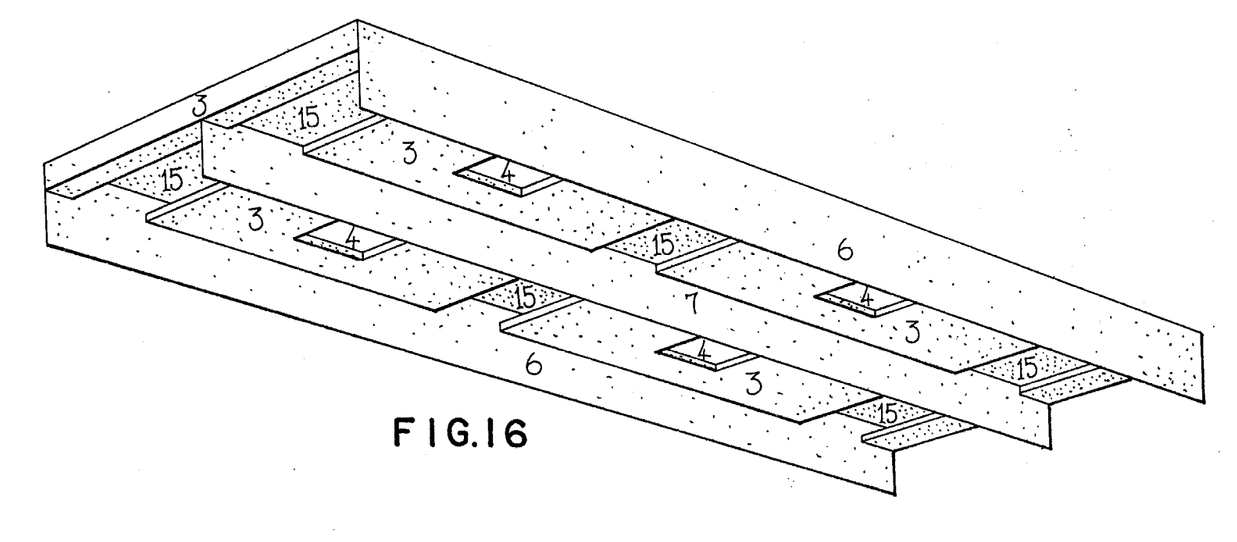
FIG. 16 is a perspective under view of the air cushion vehicle up to and including the sandwich construction, with the flexible skirts removed.
Figure 17:
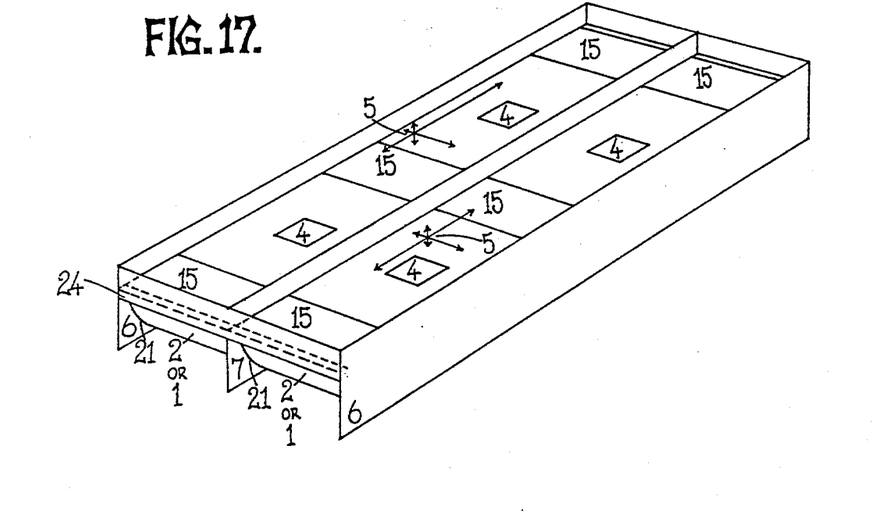
FIG. 17 is a perspective view of the vehicle with the top surface of duct 5 removed.

In operation the parallel straight sidewalls of uniform and minimal thickness as depicted in FIG. 16, move in a direction parallel to their length, and cut through the water creating minimal resistance, both wave making and frictional, and in conjunction with the flexible skirts as shown in FIG. 1, tend to contain and reduce "hump drag" and wave making resistance at low speed, thus reducing propulsive power necessary to overcome these.

If desired, the sidewalls may be given a thicker cross-section near the tops thereof, for greater strength, and a thinner cross-section near the base or water-penetrating portion to keep said resistance as low as practicable.

Propulsion of this air cushion vehicle may be by a directional water propeller attached to a "Z" drive. A single engine may drive both the water propeller and a centrally mounted centrifugal blower, in the case of the blower, either by direct coupling or variable speed hydraulic transmission.

Figure 4:
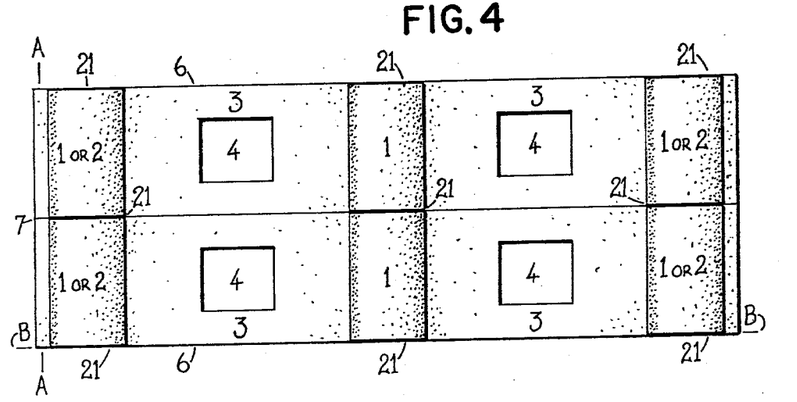
FIG. 4 is an under plan of the air cushion vehicle.

The operation of the air cushion vehicle with six number 1 type flexible skirts as depicted in FIG. 5, is as above, except that air for the four air cushions is supplied through holes 4, FIGS. 1, 4 and 16, with the movable covers still adjustable to obtain optimum ride, but always open to a sufficient extent to properly supply the air cushions.

This air cushion vehicle incorporating either of the two flexible skirting configurations described above, and as depicted in FIGS. 5 and 6, can be operated at full speed in either direction.

The claims defining the invention are as follows:

1. A waterborne air cushion vehicle comprising, in combination, a flat rigid upper rectangular sheet-like platform, a plurality of flat rigid longitudinal walls including at least two outermost walls, attached substantially at right angles thereto and depending therefrom substantially parallel with the major axis of said platform, the outermost two of said walls being disposed as sidewalls along the respective edges of said platform, a plurality of longitudinally spaced laterally aligned arrays of flexible trough-shaped skirts respectively looped with a space therein and fastened via each longitudinal edge thereof with respect to the underside of said platform flush with but independently movable with respect to adjacent pairs of said walls but extendable to a lesser depth than that of said walls, a source of pressurised air admissible via apertures of fixed size at a relatively higher pressure to said skirts and also admissible at a relatively lower pressure via variable-sized openings capable of being remotely controlled and located in said platform in communication with each of at least four open-bottomed air cushion chambers each bounded by an adjacent pair of said skirts and by an adjacent pair of said walls, and wherein the depth of said walls and of said skirts is so related to the flow rate of said air that the vehicle is buoyant upon water with said walls protruding into said water sufficiently to prevent air spillage via said walls when the vehicle is urged longitudinally through said water by propulsion means, and wherein said apertures and said openings are adapted to re-admit by reverse flow at least part of the compressed air in any one of said chambers and its associated skirts independently in response to fugitive deflection of said skirts resulting from turbulence of said water, to thereby inhibit movement of said vehicle about the pitch axis thereof.

2. A waterborne air cushion vehicle as claimed in claim 1, wherein said platform is a sandwich structure enclosing an internal duct system connecting said source of pressurised air to said apertures and to said openings.

3. A waterborne air cushion vehicle as claimed in claim 1 or 2, wherein a dendritic system of conduits connects said source of pressurised air to said apertures and to said openings.

4. A waterborne air cushion vehicle of claim 1 wherein the underside of said platform supports, or wherein said platform is co-extensive with, a slab or slabs of foam type material having a buoyancy greater than that of the material comprising said platform and-/or said walls.

5. A waterborne air cushion vehicle of claim 1, wherein said platform contains inbuilt buoyancy.

6. A waterborne air cushion vehicle of claim 1, wherein said skirts are substantially semi-circular in cross-sectional shape.

7. A waterborne air cushion vehicle of claim 1, wherein said walls are three in number, and wherein said skirts are six in number and disposed in lateral arrays each comprising two of said skirts, whereby said vehicle possesses four of said air cushion chambers.

8. A waterborne air cushion vehicle of claim 1, wherein those skirts which are located near the ends of said platform are each supplied with a row of jets extending across the width thereof and opening into the adjacent air cushion chamber, said jets being covered by a hinged flexible flap when the direction of motion of said vehicle is such that wave pressure applied to said flap exceeds the air pressure within the skirt, but said jets being uncovered by said flap when said air pressure exceeds said wave pressure in response to motion of the vehicle in an opposite direction.

9. A waterborne air cushion vehicle of claim 1, wherein said walls all have substantially the same depth throughout their length.

10. A waterborne air cushion vehicle of claim 1, wherein the ends of said walls are shaped to a point.

11. A waterborne air cushion vehicle of claim 1, wherein the ends of said walls are rounded so as to be faired into the base thereof.

* * * * *